(12) United States Patent
Iwasaki et al.

(10) Patent No.: US 8,853,114 B2
(45) Date of Patent: Oct. 7, 2014

(54) ALUMINUM TITANATE-BASED CERAMICS

(75) Inventors: Kentaro Iwasaki, Nihama (JP); Akiyoshi Nemoto, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 39 days.

(21) Appl. No.: 13/201,564

(22) PCT Filed: Feb. 16, 2010

(86) PCT No.: PCT/JP2010/052282
§ 371 (c)(1),
(2), (4) Date: Nov. 17, 2011

(87) PCT Pub. No.: WO2010/095616
PCT Pub. Date: Aug. 26, 2010

(65) Prior Publication Data
US 2012/0094824 A1 Apr. 19, 2012

(30) Foreign Application Priority Data

Feb. 17, 2009 (JP) .................. 2009-034240
Dec. 17, 2009 (JP) .................. 2009-286471
Dec. 25, 2009 (JP) .................. 2009-294751

(51) Int. Cl.
  C04B 35/478 (2006.01)
  C04B 35/465 (2006.01)
  C04B 35/626 (2006.01)
  C04B 38/00 (2006.01)
  C04B 111/00 (2006.01)

(52) U.S. Cl.
  CPC ....... C04B 35/465 (2013.01); C04B 2235/3418 (2013.01); C04B 2235/36 (2013.01); C04B 2235/3258 (2013.01); C04B 2235/3275 (2013.01); C04B 2235/96 (2013.01); C04B 2235/3217 (2013.01); C04B 2235/81 (2013.01); C04B 2235/3241 (2013.01); C04B 2235/3222 (2013.01); C04B 2111/0081 (2013.01); C04B 2235/3232 (2013.01); C04B 2235/3206 (2013.01); C04B 35/6261 (2013.01); C04B 2235/3279 (2013.01); C04B 35/478 (2013.01); C04B 38/0006 (2013.01); C04B 2235/3262 (2013.01); C04B 2111/00793 (2013.01)
  USPC ........... 501/134; 501/127; 501/128; 501/135; 501/136; 55/523

(58) Field of Classification Search
  USPC ............. 501/134, 135, 136, 127, 128; 55/523
  See application file for complete search history.

(56) References Cited

U.S. PATENT DOCUMENTS 3,890,140 A    6/1975  Asbury
4,556,098 A   12/1985  Hintermann et al.
5,008,222 A *  4/1991  Kameda ................. 501/134
7,166,552 B2 * 1/2007  Fukuda et al. ........... 501/136
7,294,164 B2 * 11/2007 Merkel .................... 55/523
2006/0021308 A1 * 2/2006 Merkel .................... 55/523
2007/0224110 A1   9/2007 Fukuda et al.

FOREIGN PATENT DOCUMENTS

JP   42-26688 A   12/1967
JP    1-115867 A   5/1989
JP    2-137768 A   5/1990
JP    4-317462 A  11/1992
WO 2005/105704 A1 11/2005

OTHER PUBLICATIONS

L. Giordano, et al., "Microstructure and thermal expansion of $Al_2TiO_5$—$MgTi_2O_5$ solid solutions obtained by reaction sintering", Journal of the Ceramic Society, 2002, pp. 1811-1822, vol. 22.
Extended European Search Report issued Jul. 2, 2012 in European Patent Appln. No. 10743742.8.
V.D. Tkachenko et al., "Influence of Refractory Oxide Additives on the Stability of Alumium Titanate", Refractories, Plenum Publishing Co., New York, NY, vol. 28, No. 3-4, Jan. 1, 1987, pp. 206-208 (XP009157283).
T.L. Lekanova et al., "Phase Relations in the Systems $Al_2TiO_5$—$Fe_2O_3$, $Al_2O_3$—$TiO_2$—$Fe_2O_3$, and $Al_2TiO_5$—$Cr_2O_3$", Inorganic Materials, vol. 40, No. 11, Jan. 1, 2004, pp. 1191-1195 (XP009160225).
E.M. Pfaff, "Herstellung von Aluminiumtitanatkeramik", "4.2.4.2" In: Jochen Kriegesmann (Hrsg.): "Technische Keramische Werkstoffe", Jan. 1, 1997, HvB-Verlag; Facverlag Deutscher Wirtschaftsdienst, GmbH, Berlin, vol. 4, pp. 17-21 (XP002677765).
Seung-Am Cho et al., "Densification and Hardness of $Al_2O_3$—$Cr_2O_3$ System With and Without Ti Addition", Ceramics International, Elsevier, Amsterdam, NL, vol. 16, No. 5, Jan. 1, 1990, pp. 301-309 (XP024157922).
P. Jeschke et al., "Aluminium Titanate—A New Material for the Non-Ferrous Metals Industry", Refractories for the New World Economy: Proceedings; UNITECR '93 Congress Sao Paulo, Brasil Oct. 31-Nov. 3, 1993; in conjunction with the 22. ALAFAR Congress, Jan. 1, 1993, pp. 843-853 (XP009151994).
E. Gugel and P. Schuster, "Keramische Massen auf de Basis von Aluminiumtitanat", Tonindustrie Zeitung, vol. 98, No. 12, Jan. 1, 1974, pp. 315-318 (XP9160259).
First Office Action issued Dec. 20, 2012 in Chinese Patent Application No. 201080008085.8 to Sumitomo Chemical Co., Ltd., with translation.
G. Xu et al., "Preparation and Properties of Aluminum Titanate Solid Solution Ceramics", Journal of the Chinese Ceramic Society, vol. 35, No. 6, Jun. 2007, pp. 717-720.

* cited by examiner

*Primary Examiner* — Karl Group
(74) *Attorney, Agent, or Firm* — Sughrue Mion, PLLC

(57)    ABSTRACT

The invention is to provide an aluminum titanate-based ceramics showing a good mechanical strength. The invention is an aluminum titanate-based ceramics obtained by firing a starting material mixture which contains a titanium element and an aluminum element, and further contains a chromium element and/or a tungsten element. Preferably, a content of a chromium source which contains the chromium element is from 0.001 to 5 parts by mass, and a content of a tungsten source which contains the tungsten element is from 0.001 to 1.0 part by mass relative to 100 parts by mass of the starting material mixture.

6 Claims, No Drawings

ALUMINUM TITANATE-BASED CERAMICS

TECHNICAL FIELD

The present invention relates to high-strength aluminum titanate-based ceramics.

BACKGROUND ART

An aluminum titanate-based ceramics is a ceramics containing titanium and aluminum as the constitutive elements therein and showing a crystal pattern of aluminum titanate in X-ray diffraction spectrum, and is known as a ceramics excellent in heat resistance (for example, Non-Patent Reference 1), and has heretofore been used as firing tools such as crucibles. Recently, the industrial usefulness of the ceramics has increased as materials for constituting ceramics filters for collecting fine carbon particles contained in the exhaust gas discharged from internal combustion engines such as diesel engines.

For producing such aluminum titanate-based ceramics, there is known a process of firing a powdery starting material mixture containing a titanium source such as titania and the like and an aluminum source such as alumina and the like (for example, Patent Reference 1).

PRIOR ART REFERENCE

Patent Reference

Patent Reference 1: WO05/105704

Non-Patent Reference

Non-Patent Reference 1: Journal of the European Ceramic Society 22 (2002), pp. 1811-1822

SUMMARY OF THE INVENTION

Problems that the Invention is to Solve

An object of the invention is to provide an aluminum titanate-based ceramics that shows good mechanical strength.

Means for Solving the Problems

The invention is an aluminum titanate-based ceramics obtained by firing a starting material mixture which contains a titanium element and an aluminum element, and further contains a chromium element and/or a tungsten element.

A content of a chromium source which contains the chromium element is preferably from 0.001 to 5 parts by mass relative to 100 parts by mass of the starting material mixture. A content of a tungsten source which contains the tungsten element is preferably from 0.001 to 1.0 part by mass relative to 100 parts by mass of the starting material mixture. Furthermore, the aluminum titanate-based ceramics of the invention preferably contains a magnesium element and/or a silicon element.

The aluminum titanate-based ceramics of the invention preferably contains aluminum magnesium titanate represented by a compositional formula $Mg_xAl_{2(1-x)}Ti_{(1+x)}O_5$ (in the formula, $0<x<1$), and a value of x is preferably from 0.01 to 0.7.

The aluminum titanate-based ceramics of the invention is preferably obtained by firing at a temperature from 1300 to 1650° C. Preferably, the aluminum titanate-based ceramics of the invention is a shaped body.

Advantage of the Invention

The aluminum titanate-based ceramics of the invention contains a chromium element-containing chromium source in an amount of from 0.001 to 5 parts by mass, and/or a tungsten element-containing tungsten source in an amount of from 0.001 to 1.0 part by mass, relative to 100 parts by mass of the total mass of the starting material mixture, and therefore has good mechanical strength.

MODE FOR CARRYING OUT THE INVENTION

The aluminum titanate-based ceramics of the invention contains at least a titanium element and an aluminum element, and further generally contains a chromium element-containing chromium source in an amount of from 0.001 to 5 parts by mass, and/or a tungsten element-containing tungsten source in an amount of from 0.001 to 1.0 part by mass, relative to 100 parts by mass of the starting material mixture. Containing these elements in amounts within these ranges, the aluminum titanate-based ceramics can have excellent mechanical strength. The content of the chromium source which contains the chromium element is generally from 0.001 to 5 parts by mass, more preferably from 0.005 to 3.0 parts by mass, relative to 100 parts by mass of the total mass of the starting material mixture. The content of the tungsten source which contains the tungsten element is generally from 0.001 to 1.0 part by mass, more preferably from 0.005 to 0.8 parts by mass, relative to 100 parts by mass of the total mass of the starting material mixture. The starting material mixture as referred herein is a mixture of all the starting materials including not only metal materials (that is, materials containing a titanium element, an aluminum element, a chromium element, a tungsten element, a magnesium element, a silicon element) but also additives such as a pore-forming agent (for example, grinding aid, deflocculant, solvent, dispersant, binder, lubricant, plasticizer, except pore-forming agent). Preferably, the aluminum titanate-based ceramics of the invention further contains a magnesium element.

Preferably, the aluminum titanate-based ceramics of the invention contains aluminum magnesium titanate represented by a compositional formula $[Mg_xAl_{2(1-x)}Ti_{(1+x)}O_5]$ (in the formula, $0<x<1$). In the formula, the value x is preferably 0.01 or more, more preferably not less than 0.01 and not more than 0.7, most preferably not less than 0.02 and not more than 0.5. Preferably, the aluminum titanate-based ceramics of the invention further contains silicon.

The X-ray diffraction spectrum of the aluminum titanate-based ceramics of the invention (powder or shaped body, and the like) includes a crystal pattern of aluminum titanate and may include other crystal pattern, for example, that of silica, alumina, titania and the like.

The ceramics of the invention can be obtained by firing a starting material that contains a titanium source, an aluminum source, and a chromium source and/or a tungsten source.

(Titanium Source)

The titanium source is not specifically limited as long as the titanium source is a starting material which contains a titanium element and can synthesize an aluminum titanate-based ceramics by being fired with an aluminum source, and titanium oxide is preferred. Titanium oxide includes, for example, titanium(IV) oxide, titanium(III) oxide, and titanium(II) oxide, and titanium (IV) oxide is preferably used. The titanium(IV) oxide may be crystalline or amorphous.

When the titanium(IV) oxide is crystalline, the crystal form thereof includes an anatase form, a rutile form, and a brookite form, and more preferred are an anatase form and a rutile form.

As the titanium source, material capable of being led to titania (titanium oxide) by firing in air can also be used. The material includes, for example, titanium salt, titanium alkoxide, titanium hydroxide, titanium nitride, titanium sulfide, and titanium. Particularly, the titanium salt includes titanium trichloride, titanium tetrachloride, titanium(IV) sulfide, titanium(VI) sulfide, and titanium(IV) sulfate. The titanium alkoxide particularly includes titanium(IV) ethoxide, titanium(IV) methoxide, titanium(IV) t-butoxide, titanium(IV) isobutoxide, titanium(IV) n-propoxide, titanium(IV) tetraisopropoxide, and their chelate compounds.

The titanium source may contain inevitable impurities that are derived from the starting materials thereof or are mixed therein in the production process. As the titanium source, powdery titanium source powder is generally used.

(Aluminum Source)

The aluminum source is not specifically limited as long as the aluminum source is a starting material which contains an aluminum element and can synthesize an aluminum titanate-based ceramics by being fired along with a titanium source, and alumina is preferred. Alumina may be crystalline or amorphous. When alumina is crystalline, the crystal form thereof includes a γ form, a δ form, a θ form, and an α form, and an α form is preferred.

As the aluminum source, a material capable of being led to alumina by firing in air can also be used. The material includes, for example, aluminum salt, aluminum alkoxide, aluminum hydroxide, and aluminum.

The aluminum salt may be an inorganic salt or an organic salt. The inorganic salt includes nitrates such as aluminum nitrate, ammonium aluminum nitrate; and carbonates such as ammonium aluminum carbonate. The organic salt includes aluminum oxalate, aluminum acetate, aluminum stearate, aluminum lactate, and aluminum laurate.

The aluminum alkoxide includes aluminum isopropoxide, aluminum ethoxide, aluminum sec-butoxide, and aluminum tert-butoxide.

The aluminum hydroxide may be crystalline or amorphous. When the aluminum hydroxide is crystalline, the crystal form thereof includes, for example, a gibbsite form, a bayerite form, a norstrandite form, a boehmite form, and a pseudo-boehmite form. Amorphous aluminum hydroxide includes, for example, an aluminum hydrolyzate to be obtained by hydrolysis of an aqueous solution of a water-soluble aluminum compound such as aluminum salt, aluminum alkoxide.

The aluminum source may contain inevitable impurities that are derived from the starting materials thereof or are mixed therein in the production process. As the aluminum source, a powdery aluminum source powder is generally used.

(Chromium Source)

As the chromium source, a material containing a chromium element and not interfering with the formation of aluminum titanate-based ceramics by firing can be used, for example, chromite, chrome magnesia brick, chromium oxide, chromium salt, chromium complexe, chromate salt are included.

As the chromium source, chromium in the metallic state can also be used, and not only a simple substance of chromium metal but also alloys thereof with iron may be used.

The chromium salt to be used as the chromium source may be an inorganic salt or an organic salt. The inorganic salt includes chromium nitrate, ammonium chromium sulfate, potassium chromate, lead chromate, zinc chromate, strontium chromate.

The chromium source may contain inevitable impurities that are derived from the starting materials thereof or are mixed therein in the production process. As the chromium source, a powdery chromium source powder is generally used.

(Tungsten Source)

As the tungsten source, a material containing a tungsten element and not interfering with the formation of aluminum titanate-based ceramics by firing can be used, for example, minerals such as scheelite, wolframite; tungsten complexe, tungsten compound, tungsten salt (tungsten halides such as tungsten chloride, tungsten bromide, tungsten iodide), tungstates, tungsten trioxide, ammonium paratungstate, tungsten carbide, tungsten nitride are included.

As the tungsten source, tungsten in the metallic state can also be used, and not only a simple substance of tungsten metal but also alloys thereof with iron may be used.

The tungsten source may contain inevitable impurities that are derived from the starting materials thereof or are mixed therein in the production process. As the tungsten source, a powdery tungsten source powder is generally used.

(Magnesium Source)

The ceramics of the invention may contain a magnesium element. The ceramics can be obtained by firing a starting material that contains a magnesium source. The magnesium source is not specifically limited as long as the magnesium source may be one that contains magnesium and does not interfere with the formation of aluminum titanate-based ceramics by firing, preferably one capable of being led to aluminum magnesium titanate along with a titanium source and an aluminum source. The magnesium source includes, for example, a powder that contains a material capable of being led to magnesia by firing in air such as magnesia (magnesium oxide), and magnesia is preferred.

The material capable of being led to magnesia by firing in air includes, for example, magnesium salt, magnesium alkoxide, magnesium hydroxide, magnesium nitride, metal magnesium. Particularly, the magnesium salt includes magnesium chloride, magnesium perchlorate, magnesium phosphate, magnesium pyrophosphate, magnesium oxalate, magnesium nitrate, magnesium carbonate, magnesium acetate, magnesium sulfate, magnesium citrate, magnesium lactate, magnesium stearate, magnesium salicylate, magnesium myristate, magnesium gluconate, magnesium dimethacrylate, and magnesium benzoate. The magnesium alkoxide particularly includes magnesium methoxide, and magnesium ethoxide.

As the magnesium source, a starting material also serving as an aluminum source can also be used. The starting material includes, for example, magnesia spinel ($MgAl_2O_4$).

The magnesium source may contain inevitable impurities that are derived from the starting materials thereof or are mixed therein in the production process. As the magnesium source, a powdery magnesium source powder is generally used.

(Silicon Source)

The ceramics of the invention may contain a silicon element. The ceramics can be obtained by firing a starting material that contains a silicon source. The silicon source is not specifically limited as long as the silicon source may be a starting material that contains silicon and does not interfere with the formation of aluminum titanate-based ceramics by firing, and silicon oxide is preferred. The silicon oxide includes silicon dioxide, silicon monoxide.

As the silicon source, a material capable of being led to silicon oxide (silica) by firing in air can also be used. The material includes, for example, silicic acid, silicon carbide, silicon nitride, silicon sulfide, silicon tetrachloride, silicon acetate, sodium silicate, sodium orthosilicate, feldspar, and glass frit.

As a concrete silicon source, glass frit is preferably used from the viewpoint of easiness of industrial availability and stable composition thereof. Glass frit means flaky or powdery glass to be obtained by grinding glass. As the glass to constitute the glass frit, silicate glass and the like are included, and ordinary silicate glass that comprises silicic acid (silicon dioxide, $SiO_2$) as the main ingredient thereof (contained in an amount of more than 50% by mass of all the constitutive ingredients) is preferably used. Like an ordinary silicate glass, the other constitutive ingredients in silicic acid may contain alumina ($Al_2O_3$), sodium oxide ($Na_2O$), potassium oxide ($K_2O$), calcium oxide (CaO), magnesia (MgO). Preferably $ZrO_2$ is contained for improving the hot water resistance of the glass itself, and the amount of $ZrO_2$ is preferably not less than 0.1% by mass and not more than 10% by mass.

As the silicon source, a starting material serving as an aluminum source can also be used. The starting material includes, for example, feldspar.

The silicon source may contain inevitable impurities that are derived from the starting materials thereof or are mixed therein in the production process. As the silicon source, a powdery silicon source powder is generally used.

(Production Process)

As the process for obtaining the aluminum titanate-based ceramics of the invention, various known processes are employable, including, for example, a process comprising mixing above-mentioned each starting material powders and firing the resulting starting material mixture to give an aluminum titanate-based ceramics. In this case, also as the process for mixing the starting material powders, various known processes are employable, any of a process of mixing them in a dry atmosphere (mixing process in dry condition), or a process of mixing them in a wet atmosphere (mixing process in wet condition) is employable.

(Step of Mixing Starting Materials)

When mixing in a dry atmosphere, above-mentioned each starting material powders may be mixed and stirred in a grinding container not being dispersed in a liquid medium, and the starting material powders may be pulverized simultaneously by being stirred in a grinding container along with grinding media coexisting therein.

As the grinding container, one made of a metal material such as stainless steel may be used, and its inner surface may be coated with a fluororesin, a silicone resin, an urethane resin and the like. The grinding media is, for example, alumina beads, zirconia beads and the like having a diameter of from 1 mm to 100 mm, preferably from 5 mm to 50 mm.

When the starting material powders are mixed and simultaneously pulverized, for example, the starting material powders are put into the grinding container along with grinding media thereinto, then the grinding container is vibrated or rotated whereby the starting material powders are mixed and simultaneously pulverized. For vibrating or rotating the grinding container, an ordinary grinding machine, for example, a shaking mill, a ball mill, a planetary mill, a high-speed rotary grinding machine (pin mill and the like) and the like can be used. Shaking mill is preferred from the viewpoint of easiness of industrial operation.

The time to be taken for pulverizing is generally from 1 minute to 6 hours, preferably from 1.5 minutes to 2 hours. In pulverizing the starting material powders in dry condition, additives such as a grinding aid, a deflocculant and the like may be added thereto.

For mixing in a wet atmosphere, for example, the starting material powders such as a silicon source powder and the like may be, while kept dispersed in a solvent, mixed with other starting material powders, and in general, a silicon source powder kept dispersed in a solvent is mixed with other starting material powders.

A dispersant may be added to the solvent in wet mixing. The dispersant includes, for example, inorganic acids such as nitric acid, hydrochloric acid, sulfuric acid; organic acids such as oxalic acid, citric acid, acetic acid, malic acid, lactic acid; alcohols such as methanol, ethanol, propanol; surfactants such as ammonium polycarboxylate.

In the mixing process in wet condition, mixing by use of a grinding machine such as a media-assisted stirring mill, a ball mill or a vibration mill is preferred.

As the mixing process in wet condition, a process of stirring treatment alone in an ordinary liquid solvent is included. As the liquid solvent, for example, alcohols such as monools (methanol, ethanol, butanol, propanol, etc.), glycols (propylene glycol, polypropylene glycol, ethylene glycol, etc.), or ion-exchanged water can be used, and ion-exchanged water is more preferred.

Also in the mixing process in wet condition, the starting material powders may be stirred and simultaneously pulverized in a grinding container along with grinding media coexisting therein. For example, starting material powders and grinding media are put into a grinding container, then the grinding container may be vibrated or rotated to pulverize the powders therein.

In pulverizing the starting material powders in wet condition, additives such as a grinding aid, a deflocculant and the like may be added thereto apart from the grinding media. After mixing in a wet atmosphere as described above, starting material mixture can be obtained by removing the solvent.

(Firing Step)

In the production process of the invention, the powdery starting material mixture obtained in the above-mentioned manner may be fired as a powder form and then shaped into a shaped body, or may be fired after the starting material mixture is shaped. The powdery starting material mixture may be fired, then shaped into a shaped body, and the shaped body may be further fired.

The firing temperature is generally 1300° C. or higher, preferably 1400° C. or higher, and is generally 1650° C. or lower, preferably 1550° C. or lower. The heating rate up to the firing temperature is not specifically limited, and may be generally from 1° C./hr to 500° C./hr. During firing, the process may include a step of maintaining at a constant temperature. The cooling rate down to room temperature is not specifically limited, and may be generally from 1° C./hr to 500° C./hr.

In general, the firing is attained in air, and depending on the type and the amount ratio of the starting material powders to be used (that is, titanium source powder, aluminum source powder, chromium source powder, tungsten source powder, magnesium source powder, and silicon source powder), the mixture may be fired in an inert gas such as nitrogen gas, argon gas and the like, or may be fired in a reducing gas such as carbon monoxide gas, hydrogen gas and the like. The firing may be carried out in an atmosphere where the water vapor partial pressure is reduced.

In general, the firing is carried out using an ordinary firing furnace such as a tubular electric furnace, a boxy electric furnace, a tunnel furnace, a far-IR furnace, a microwave heating furnace, a shaft furnace, a reverberating furnace, a rotary furnace, or a roller hearth furnace. The firing may be carried out by batch process, or may be carried out by continuous process. The firing may be carried out in a static mode or may be carried out in a fluidized mode.

The time to be taken for the firing may be a time enough for transition of the starting material mixture into an aluminum titanate-based ceramics, and the time is generally from 10 minutes to 24 hours though varying depending on the amount of the starting material mixture, the type of the firing furnace, the firing temperature, the firing atmosphere and the like.

When a massive aluminum titanate-based ceramics is obtained as the fired body, the fired body may be further pulverized to give an aluminum titanate-based ceramics powder. The grinding may be carried out by hand or by the use of a mortar, or by the use of an ordinary grinding machine such as a ball mill, a shaking mill, a planetary mill, a media-assisted stirring mill, a pin mill, a jet mill, a hammer mill, a roll mill. The aluminum titanate-based ceramics powders obtained by pulverizing may be classified by an ordinary method.

By the process mentioned above, the intended aluminum titanate-based ceramics can be obtained.

(Shaping Step)

The aluminum titanate-based ceramics of the invention may be, before being fired, shaped into a shaped body by an ordinary shaping method. The shaping method includes, for example, uniaxial shaping or extrusion shaping. The shaping machine to be used for the shaping includes a uniaxial press, an extruder, a tableting machine, and a granulator.

In extrusion shaping, a pore-forming agent, a binder, a lubricant, a plasticizer, a dispersant, a solvent and the like may be added to the starting material mixture, which can be shaped. The pore-forming agent includes carbon materials such as graphite; resins such as polyethylene, polypropylene, polymethyl methacrylate; vegetable materials such as starch, nutshell, walnut-shell, corn; ice, and dry ice. The binder includes celluloses such as methyl cellulose, carboxymethyl cellulose, sodium carboxymethyl cellulose; alcohols such as polyvinyl alcohol; salts such as lignin sulfonate; waxes such as paraffin wax, microcrystalline wax; and thermoplastic resins such as EVA, polyethylene, polystyrene, liquid-crystal polymer, engineering plastics. The lubricant and the plasticizer include alcohols such as glycerin; higher fatty acids such a caprylic acid, lauric acid, palmitic acid, alginic acid, oleic acid, stearic acid; and metal salts of stearic acid such as aluminum stearate. As the solvent, water such as ion-exchanged water is generally use, and the ion-exchanged water and the like whose temperature is controlled is preferably used. Some substances may serve both as a pore-forming agent and a binder. The substance includes a substance that acts to adhere the particles to each other during shaping, to thereby keep the form of the shaped body, and during the subsequent firing, the substance burns by itself to form pores. The substance particularly includes polyethylene.

The shape of the shaped body to be obtained by shaping the starting material mixture is not specifically limited, and includes, for example, a honeycomb structure, a spherical structure, a cubic structure, a rectangular block structure. Of those, a honeycomb structure is preferred. In extrusion shaping, metal pieces of stainless steel and the like from the surface of the extrusion shaping apparatus may mix into the starting materials and the shaped bodies, owing to the abrasion of metals caused by kneading of the starting material mixture.

EXAMPLES

The invention is described in detail with reference to the following Examples, but the invention is not limited by these Examples.

(Measurement of Aluminum Titanate Conversion Ratio)

The aluminum (magnesium) titanate conversion ratio (hereinafter referred to as "AT conversion ratio") of the aluminum titanate-based ceramics obtained in Examples and Comparative Examples was calculated by the following formula (3) from the integrated intensity ($I_T$) of the peak [assigned to the titania-rutile phase face] appearing at the position of 2θ=27.4° in the powdery X-ray diffraction spectrum, and the integrated intensity ($I_{AT}$) of the peak [assigned to the aluminum titanate phase face and aluminum magnesium titanate phase face] appearing at the position of 2θ=33.7°:

$$\text{AT Conversion Ratio}(\%) = 100 \times I_{AT}/(I_{AT}+I_T) \quad (3)$$

(Measurement of Mechanical Strength of Aluminum Titanate-Based Ceramics Shaped Body)

The mechanical strength (three-point bending strength) of the aluminum titanate-based ceramics shaped bodies obtained in Examples and Comparative Examples (produced by firing the shaped body of starting material mixture) was measured according to the method of JIS R 1601.

Example 1

The following starting material powders were used. "Part by mass" of each ingredient is based on 100 parts by mass of the total of the starting material powders.

<Starting Material Powders>

| | |
|---|---|
| (1) Aluminum source powder | 23 parts by mass |
| aluminum oxide powder (corundum form crystal) | |
| (2) Titanium source powder | 39 parts by mass |
| titanium oxide powder (rutile form crystal) | |
| (3) Chromium source powder | 2 parts by mass |
| chromium nitrate | |
| (4) Magnesium source powder | 15 parts by mass |
| magnesia spinel powder | |
| (5) Silicon source powder | 3 parts by mass |
| glass frit (Takara Standard's "CK0832") | |
| (6) Additives | |
| polyethylene powder | 9 parts by mass |
| methyl cellulose powder | 9 parts by mass |

The aluminum source powder, the titanium source powder, the chromium source powder, the magnesium source powder and the silicon source powder (total amount, 100 g) and the additives (total amount, 122 g) were put into a plastic container [inner volume, 1 L] along with 500 g of alumina beads [diameter, 15 mm]. Subsequently, the container was rotated with a ball mill at a rotation number of 80 rpm for 4 hours to mix the materials in the container, thereby giving a starting material mixture. Into an alumina-made crucible, 5 g of the obtained starting material mixture was put, and in air in an electric furnace, heated up to a highest temperature of 1450° C. at a heating rate of 300° C./hr for a period of from 10 to 250 hours, and fired under the condition that maintaining time (firing time) at the highest temperature was 4 hours, thereafter cooled down to room temperature at a cooling rate of 300° C./hr, thereby giving an aluminum titanate-based ceramics of the invention.

Obtaining the diffraction spectrum of the powder through powdery X-ray diffractometry, the powder showed a crystal peak of aluminum magnesium titanate. The AT conversion ratio of the powder was determined, and was 100%.

Apart from this, 2 g of the starting material mixture obtained in this Example was shaped with a uniaxial press under a pressure of 0.3 t/cm² to form a shaped body having a length of about 50 mm, a width of about 4 mm and a thickness of about 3 mm. Next, the shaped body was fired in a boxy electric furnace at a heating rate of 300° C./hr and at 1450° C. for 4 hours to give an aluminum titanate-based ceramics shaped body. Subsequently, this was cooled down to room temperature at a cooling rate of 300° C./hr, and the aluminum titanate-based ceramics shaped body was taken out of the electric furnace. The three-point bending strength of the aluminum titanate-based ceramics shaped body was 6.7 MPa. When the obtained aluminum titanate-based ceramics was represented by a compositional formula $Mg_xAl_{2(1-x)}Ti_{(1+x)}O_5$, the value x was 0.24.

Example 2

The following starting material powders were used. "Part by mass" of each ingredient is based on 100 parts by mass of the total of the starting material powders.
<Starting Material Powders>

| | |
|---|---|
| (1) Aluminum source powder<br>aluminum oxide powder (corundum form crystal) | 24 parts by mass |
| (2) Titanium source powder<br>titanium oxide powder (rutile form crystal) | 40 parts by mass |
| (3) Tungsten source powder<br>tungsten oxide | 0.4 parts by mass |
| (4) Magnesium source powder<br>magnesia spinel powder | 15 parts by mass |
| (5) Silicon source powder<br>glass frit (Takara Standard's "CK0832") | 3.2 parts by mass |
| (6) Additives | |
| polyethylene powder | 9.1 parts by mass |
| methyl cellulose powder | 8.9 parts by mass |

The aluminum source powder, the titanium source powder, the tungsten source powder, the magnesium source powder and the silicon source powder (total amount, 100 g) and the additives were, in the ratio mentioned above, put into a plastic container [inner volume, 1 L] along with 500 g of alumina beads [diameter, 15 mm]. Subsequently, the container was rotated with a ball mill at a rotation number of 80 rpm for 4 hours to mix the materials in the container, thereby giving a starting material mixture. Into an alumina-made crucible, 5 g of the obtained starting material mixture was put, and in air in an electric furnace, heated up to a highest temperature of 1450° C. at a heating rate of 300° C./hr for a period of from 10 to 250 hours, and fired under the condition that maintaining time at the highest temperature was 4 hours, and then cooled down to room temperature at a cooling rate of 300° C./hr, thereby giving an aluminum titanate-based ceramics of the invention.

Obtaining the diffraction spectrum of the powder through powdery X-ray diffractometry, the powder showed a crystal peak of aluminum magnesium titanate. The AT conversion ratio of the powder was determined, and was 100%.

Apart from this, 2 g of the starting material mixture obtained in this Example was shaped with a uniaxial press under a pressure of 0.3 t/cm² to form a shaped body having a length of about 50 mm, a width of about 4 mm and a thickness of about 3 mm. Next, the shaped body was fired in a boxy electric furnace at a heating rate of 300° C./hr and at 1450° C. for 4 hours to give an aluminum titanate-based ceramics shaped body. Subsequently, this was cooled down to room temperature at a cooling rate of 300° C./hr, and the aluminum titanate-based ceramics shaped body was taken out of the electric furnace. The three-point bending strength of the aluminum titanate-based ceramics shaped body was 6.4 MPa. When the obtained aluminum titanate-based ceramics was represented by a compositional formula $Mg_xAl_{2(1-x)}Ti_{(1+x)}O_5$, the value x was 0.24.

Comparative Example 1

The following starting material powders were used. "Part by mass" of each ingredient is based on 100 parts by mass of the total of the starting material powders.
<Starting Material Powders>

| | |
|---|---|
| (1) Aluminum source powder<br>aluminum oxide powder (corundum form crystal) | 23 parts by mass |
| (2) Titanium source powder<br>titanium oxide powder (rutile form crystal) | 39 parts by mass |
| (3) Cobalt compound<br>cobalt nitrate | 2 parts by mass |
| (4) Magnesium source powder<br>magnesia spinel powder | 15 parts by mass |
| (5) Silicon source powder<br>glass frit (Takara Standard's "CK0832") | 3 parts by mass |
| (6) Additives | |
| polyethylene powder | 9 parts by mass |
| methyl cellulose powder | 9 parts by mass |

The aluminum source powder, the titanium source powder, the cobalt compound, the magnesium source powder and the silicon source powder (total amount, 100 g) and the additives (total amount, 122 g) were put into a plastic container [inner volume, 1 L] along with 500 g of alumina beads [diameter, 15 mm]. Subsequently, the container was rotated with a ball mill at a rotation number of 80 rpm for 4 hours to mix the materials in the container, thereby giving a starting material mixture. Into an alumina-made crucible, 5 g of the obtained starting material mixture was put, and in air in an electric furnace, heated up to a highest temperature of 1450° C. at a heating rate of 300° C./hr for a period of from 10 to 250 hours, and fired under the condition that maintaining time was 4 hours, and then cooled down to room temperature at a cooling rate of 300° C./hr, thereby giving an aluminum titanate-based ceramic of the invention.

Obtaining the diffraction spectrum of the powder through powdery X-ray diffractometry, the powder showed a crystal peak of aluminum magnesium titanate. The AT conversion ratio of the powder was determined, and was 100%.

Apart from this, 2 g of the starting material mixture obtained in this Example was shaped with a uniaxial press under a pressure of 0.3 t/cm² to form a shaped body having a length of about 50 mm, a width of about 4 mm and a thickness of about 3 mm. Next, the shaped body was fired in a boxy electric furnace at a heating rate of 300° C./hr and at 1450° C. for 4 hours to give an aluminum titanate-based ceramics shaped body. Subsequently, this was cooled down to room temperature at a cooling rate of 300° C./hr, and the aluminum titanate-based ceramics shaped body was taken out of the electric furnace. The three-point bending strength of the aluminum titanate-based ceramics shaped body was 5.6 MPa. When the obtained aluminum titanate-based ceramics was represented by a compositional formula $Mg_xAl_{2(1-x)}Ti_{(1+x)}O_5$, the value x was 0.24.

Comparative Example 2

The following starting material powders were used. "Part by mass" of each ingredient is based on 100 parts by mass of the total of the starting material powders.

<Starting Material Powders>

| | |
|---|---|
| (1) Aluminum source powder<br>aluminum oxide powder (corundum form crystal) | 23 parts by mass |
| (2) Titanium source powder<br>titanium oxide powder (rutile form crystal) | 39 parts by mass |
| (3) Nickel compound<br>nickel nitrate | 2 parts by mass |
| (4) Magnesium source powder<br>magnesia spinel powder | 15 parts by mass |
| (5) Silicon source powder<br>glass frit (Takara Standard's "CK0832") | 3 parts by mass |
| (6) Additives | |
| polyethylene powder | 9 parts by mass |
| methyl cellulose powder | 9 parts by mass |

The aluminum source powder, the titanium source powder, the nickel compound, the magnesium source powder and the silicon source powder (total amount, 100 g) and the additives (total amount, 122 g) were put into a plastic container [inner volume, 1 L] along with 500 g of alumina beads [diameter, 15 mm]. Subsequently, the container was rotated with a ball mill at a rotation number of 80 rpm for 4 hours to mix the materials in the container, thereby giving a starting material mixture. Into an alumina-made crucible, 5 g of the obtained starting material mixture was put, and in air in an electric furnace, heated up to a highest temperature of 1450° C. at a heating rate of 300° C./hr for a period of from 10 to 250 hours, and fired under the condition that maintaining time at the highest temperature was 4 hours, and thereafter cooled down to room temperature at a cooling rate of 300° C./hr, thereby giving an aluminum titanate-based ceramics of the invention.

Obtaining the diffraction spectrum of the powder through powdery X-ray diffractometry, the powder showed a crystal peak of aluminum magnesium titanate. The AT conversion ratio of the powder was determined, and was 100%.

Apart from this, 2 g of the starting material mixture obtained in this Example was shaped with a uniaxial press under a pressure of 0.3 t/cm² to form a shaped body having a length of about 50 mm, a width of about 4 mm and a thickness of about 3 mm. Next, the shaped body was fired in a boxy electric furnace at a heating rate of 300° C./hr and at 1450° C. for 4 hours to give an aluminum titanate-based ceramics shaped body. Subsequently, this was cooled down to room temperature at a cooling rate of 300° C./hr, and the aluminum titanate-based ceramics shaped body was taken out of the electric furnace. The three-point strength of the aluminum titanate-based ceramics shaped body or the bending strength of the fired body was 5.4 MPa. When the obtained aluminum titanate-based ceramics was represented by a compositional formula $Mg_xAl_{2(1-x)}Ti_{(1+x)}O_5$, the value x was 0.24.

Comparative Example 3

The following starting material powders were used. "Part by mass" of each ingredient is based on 100 parts by mass of the total of the starting material powders.
<Starting Material Powders>

| | |
|---|---|
| (1) Aluminum source powder<br>aluminum oxide powder (corundum form crystal) | 24 parts by mass |
| (2) Titanium source powder<br>titanium oxide powder (rutile form crystal) | 40 parts by mass |
| (3) Magnesium source powder<br>magnesia spinel powder | 15 parts by mass |
| (4) Silicon source powder<br>glass frit (Takara Standard's "CK0832") | 3.2 parts by mass |
| (5) Additives | |
| polyethylene powder | 9.1 parts by mass |
| methyl cellulose powder | 8.9 parts by mass |

The aluminum source powder, the titanium source powder, the magnesium source powder and the silicon source powder (total amount, 100 g) and the additives (total amount, 120 g) were put into a plastic container [inner volume, 1 L] along with 500 g of alumina beads [diameter, 15 mm]. Subsequently, the container was rotated with a ball mill at a rotation number of 80 rpm for 4 hours to mix the materials in the container, thereby giving a starting material mixture. Into an alumina-made crucible, 5 g of the obtained starting material mixture was put, and in air in an electric furnace, heated up to a highest temperature of 1450° C. at a heating rate of 300° C./hr for a period of from 10 to 250 hours, and fired under the condition that maintaining time at the highest temperature was 4 hours, and thereafter cooled down to room temperature at a cooling rate of 300° C./hr, thereby giving an aluminum titanate-based ceramics of the invention.

Obtaining the diffraction spectrum of the powder through powdery X-ray diffractometry, the powder showed a crystal peak of aluminum magnesium titanate. The AT conversion ratio of the powder was determined, and was 100%.

Apart from this, 2 g of the starting material mixture obtained in this Example was shaped with a uniaxial press under a pressure of 0.3 t/cm² to form a shaped body having a length of about 50 mm, a width of about 4 mm and a thickness of about 3 mm. Next, the shaped body was fired in a boxy electric furnace at a heating rate of 300° C./hr and at 1450° C. for 4 hours to give an aluminum titanate-based ceramics shaped body. Subsequently, this was cooled down to room temperature at a cooling rate of 300° C./hr, and the aluminum titanate-based ceramics shaped body was taken out of the electric furnace. The three-point bending strength of the aluminum titanate-based ceramics shaped body was 5.7 MPa. When the obtained aluminum titanate-based ceramics was represented by a compositional formula $Mg_xAl_{2(1-x)}Ti_{(1+x)}O_5$, the value x was 0.24.

Comparative Example 4

The following starting material powders were used. "Part by mass" of each ingredient is based on 100 parts by mass of the total of the starting material powders.
<Starting Material Powders>

| | |
|---|---|
| (1) Aluminum source powder<br>aluminum oxide powder (corundum form crystal) | 23 parts by mass |
| (2) Titanium source powder<br>titanium oxide powder (rutile form crystal) | 39 parts by mass |
| (3) Tungsten source powder<br>tungsten oxide | 2 parts by mass |
| (4) Magnesium source powder<br>magnesia spinel powder | 15 parts by mass |
| (5) Silicon source powder<br>glass frit (Takara Standard's "CK0832") | 3 parts by mass |
| (6) Additives | |
| polyethylene powder | 9 parts by mass |
| methyl cellulose powder | 9 parts by mass |

The aluminum source powder, the titanium source powder, the tungsten compound, the magnesium source powder and the silicon source powder (total amount, 100 g) and the additives were, in the ratio mentioned above, put into a plastic container [inner volume, 1 L] along with 500 g of alumina beads [diameter, 15 mm]. Subsequently, the container was rotated with a ball mill at a rotation number of 80 rpm for 4 hours to mix the materials in the container, thereby giving a starting material mixture. Into an alumina-made crucible, 5 g of the obtained starting material mixture was put, and in air in an electric furnace, heated up to a highest temperature of 1450° C. at a heating rate of 300° C./hr for a period of from 10 to 250 hours, and fired under the condition that maintaining time at the highest temperature was 4 hours, and thereafter cooled down to room temperature at a cooling rate of 300° C./hr, thereby giving an aluminum titanate-based ceramics of the invention.

Obtaining the diffraction spectrum of the powder through X-ray diffractometry, the powder showed a crystal peak of aluminum magnesium titanate. The AT conversion ratio of the powder was determined, and was 100%.

Apart from this, 2 g of the starting material mixture obtained in this Example was shaped with a uniaxial press under a pressure of 0.3 t/cm² to form a shaped body having a length of about 50 mm, a width of about 4 mm and a thickness of about 3 mm. Next, the shaped body was fired in a boxy electric furnace at a heating rate of 300° C./hr and at 1450° C. for 4 hours to give an aluminum titanate-based ceramics shaped body. Subsequently, this was cooled down to room temperature at a cooling rate of 300° C./hr, and the aluminum titanate-based ceramics shaped body was taken out of the electric furnace. The three-point bending strength of the aluminum titanate-based ceramics shaped body was 4.1 MPa. When the obtained aluminum titanate-based ceramics was represented by a compositional formula $Mg_xAl_{2(1-x)}Ti_{(1+x)}O_5$, the value x was 0.24.

Comparative Example 5

The following starting material powders were used. "Part by mass" of each ingredient is based on 100 parts by mass of the total of the starting material powders.
<Starting, Material Powders>

| | |
|---|---|
| (1) Aluminum source powder | 23 parts by mass |
| aluminum oxide powder (corundum form crystal) | |
| (2) Titanium source powder | 39 parts by mass |
| titanium oxide powder (rutile form crystal) | |
| (3) Manganese compound | 2 parts by mass |
| manganese oxide | |
| (4) Magnesium source powder | 15 parts by mass |
| magnesia spinel powder | |
| (5) Silicon source powder | 3 parts by mass |
| glass frit (Takara Standard's "CK0832") | |
| (6) Additives | |
| polyethylene powder | 9 parts by mass |
| methyl cellulose powder | 9 parts by mass |

The aluminum source powder, the titanium source powder, the manganese compound powder, the magnesium source powder and the silicon source powder (total amount, 100 g) and the additives were, in the ratio mentioned above, put into a plastic container [inner volume, 1 L] along with 500 g of alumina beads [diameter, 15 mm]. Subsequently, the container was rotated with a ball mill at a rotation number of 80 rpm for 4 hours to mix the materials in the container, thereby giving a starting material mixture. Into an alumina-made crucible, 5 g of the obtained starting material mixture was put, and in air in an electric furnace, heated up to a highest temperature of 1450° C. at a heating rate of 300° C./hr for a period of from 10 to 250 hours, and fired under the condition that maintaining time at the highest temperature was 4 hours, and thereafter cooled down to room temperature at a cooling rate of 300° C./hr, thereby giving an aluminum titanate-based ceramics of the invention.

Obtaining the diffraction spectrum of the powder through powdery X-ray diffractometry, the powder showed a crystal peak of aluminum magnesium titanate. The AT conversion ratio of the powder was determined, and was 100%.

Apart from this, 2 g of the starting material mixture obtained in this Example was shaped with a uniaxial press under a pressure of 0.3 t/cm² to form a shaped body having a length of about 50 mm, a width of about 4 mm and a thickness of about 3 mm. Next, the shaped body was fired in a boxy electric furnace at a heating rate of 300° C./hr and at 1450° C. for 4 hours to give an aluminum titanate-based ceramics shaped body. Subsequently, this was cooled down to room temperature at a cooling rate of 300° C./hr, and the aluminum titanate-based ceramics shaped body was taken out of the electric furnace. The three-point bending strength of the aluminum titanate-based ceramics shaped body was 3.2 MPa. When the obtained aluminum titanate-based ceramics was represented by a compositional formula $Mg_xAl_{2(1-x)}Ti_{(1+x)}O_5$, the value x was 0.24.

The aluminum titanate-based ceramics obtained in Example 1 has a high mechanical strength, as compared with those in Comparative Examples 1 to 3.

The aluminum titanate-based ceramic obtained in Example 2 has a high mechanical strength, as compared with those in Comparative Examples 4 and 5.

The mode and Examples for carrying out the invention disclosed at this time are exemplification in all aspects, and those should be considered unlimitedly. The scope of the invention is indicated not by the above-mentioned description but by the claims, and is intended to comprise all variations in the meaning and in the range of claims-equivalent.

INDUSTRIAL APPLICABILITY

The aluminum titanate-based ceramics of the invention is usable, for example, for tools for firing furnaces such as crucibles, setters, saggers, refractories; exhaust gas filters and catalyst carriers for use for exhaust gas purification in internal combustion engines such as diesel engines, gasoline engines; filtration filters for use for filtration of edibles such as beer; ceramics filters such as selective permeation filters for selectively permeating vapor components formed in oil purification, such as carbon monoxide, carbon dioxide, nitrogen, oxygen; electronic parts such as substrates, capacitors.

The invention claimed is:

1. An aluminum titanate-based ceramics obtained by firing a starting material mixture which contains a titanium element, an aluminum element, a magnesium element, and a silicon element, and further contains a chromium element,
wherein a content of a chromium source which contains the chromium element is from 0.001 to 5 parts by mass relative to 100 parts by mass of the starting material mixture.

2. The aluminum titanate-based ceramics according to claim 1, which further contains a tungsten element, wherein a content of a tungsten source which contains the tungsten element is from 0.001 to 1.0 part by mass relative to 100 parts by mass of the starting material mixture.

3. The aluminum titanate-based ceramics according to claim 1, which contains aluminum magnesium titanate represented by a compositional formula $Mg_xAl_{2(1-x)}Ti_{(1+x)}O_5$ (in the formula, 0<x<1).

4. The aluminum titanate-based ceramics according to claim 3, wherein a value of x is from 0.01 to 0.7.

5. The aluminum titanate-based ceramics according to claim 1, which is obtained by firing at a temperature from 1300 to 1650° C.

6. The aluminum titanate-based ceramics according to claim 1, which is a shaped body.

* * * * *